Patented Aug. 10, 1937

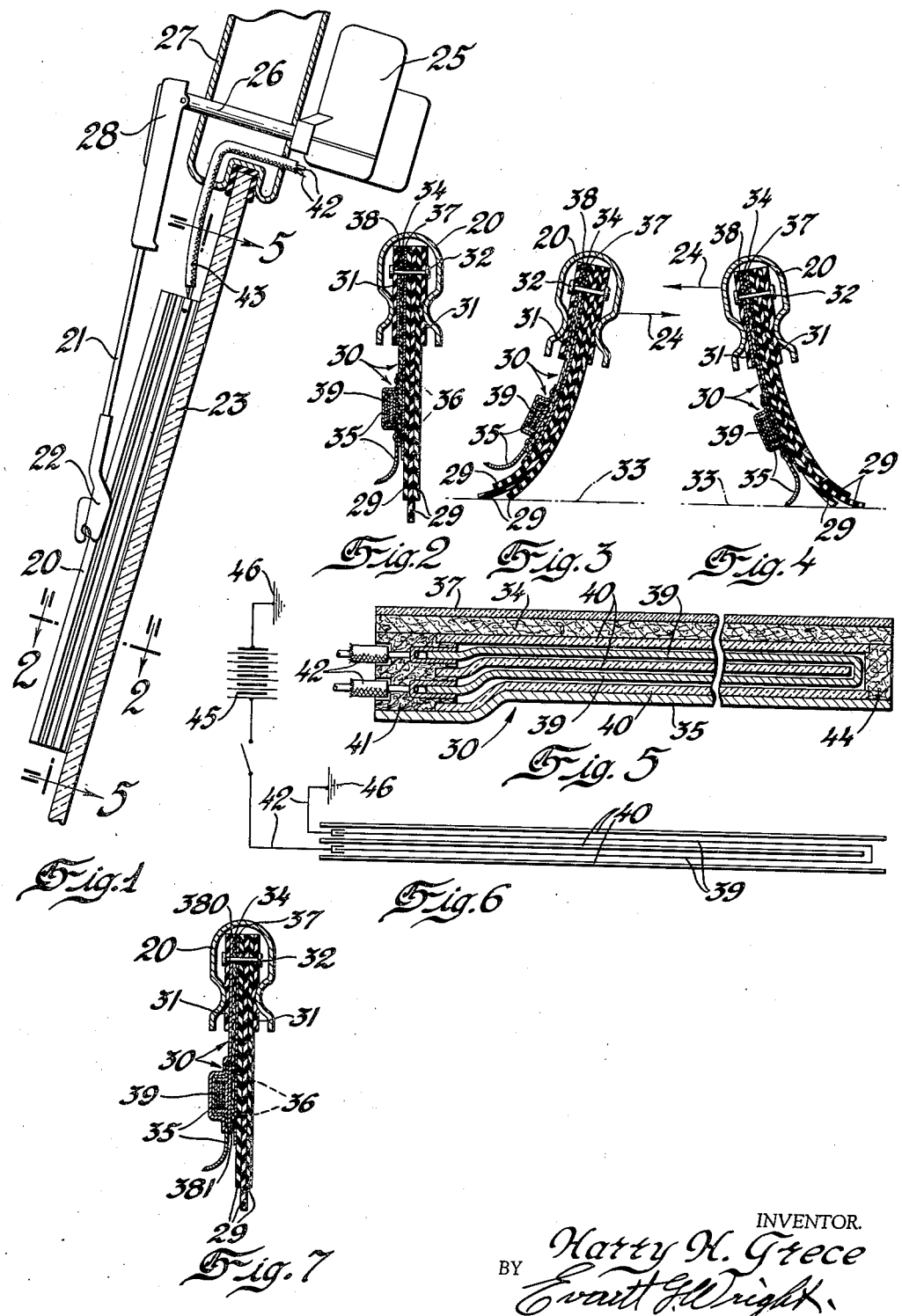

2,089,357

UNITED STATES PATENT OFFICE 2,089,357

HEATED WINDSHIELD WIPER BLADE

Harry H. Grece, Detroit, Mich.

Application September 17, 1936, Serial No. 101,279

14 Claims. (Cl. 219—19)

This invention relates to windshield wiper blades and in particular to heated means for use in combination with the usual windshield wiper blade for removing snow, ice and sleet from the windshields of automobiles and the like.

The usual windshield wiper blade comprises one or more plies of flexible composition rubber or the like retained in a metal back and adapted to be wiped or drawn across the outside surface of a glass windshield with the lower edges of the said plies of rubber in contact with the surface of the windshield.

When ice, snow and sleet form on a windshield, the usual windshield wiper blade wipes over the deposits formed on the said windshield with little or no effect. My co-pending application for Patent Serial No. 95,581 discloses improved mechanical means usable in combination with the usual windshield wiper blade for removing snow, ice and sleet from windshields wiped thereby which accommodates itself to irregularities of the surface of the windshield.

Many attempts have been made to provide satisfactory heated windshield wiper blades which thoroughly clean the windshield of an automobile or the like without the consumption of a large amount of current from the electrical system of the said vehicle. One of the difficulties encountered has been the trapping of ice, snow, or slush by or in the heated blade which causes a large loss of heat inasmuch as the said trapped ice, snow or slush cools the heated blade and makes it ineffective. Some heated windshield wiper blades have been cumbersome, expensive to manufacture and so constructed as to permit the heating element thereof to have a deleterious effect on the wiping element thereof. Cumbersome windshield wiper blades are particularly undesirable and dangerous because of interference with normal vision through the windshield wiped thereby.

With the foregoing in view, one object of this invention is to provide, in combination with the usual windshield wiper blade heated flexible mechanical means for removing snow, ice and sleet from windshields wiped thereby.

Another object of this invention is to provide a heated windshield scraper blade adapted to function in combination with the usual wiper blade for removing snow, ice and sleet from windshields of motor vehicles and the like which consumes a minimum amount of current from the electrical system of said vehicle.

Another object of this invention is to provide a heated windshield scraper element adapted to be used in combination with the usual flexible wiper strips and flex therewith when being drawn across a windshield under light operating pressure thereagainst whereby the heated edge of the said scraper blade will conform to any irregularities in the surface of said windshield and will remove fine films of ice or thin layers of frost therefrom after which the said flexible wiper strips remove moisture from the said windshield and give the surface thereof a cleaning to provide visibility after the scraping thereof.

Another object of this invention is to provide a heated windshield scraper blade and wiper adapted to be assembled into a standard type windshield wiper blade back and holder for use with a standard type windshield wiper arm and motor.

Other objects of this invention will become apparent by reference to the following detailed description taken in connection with the accompanying drawing, in which:

Fig. 1 is a vertical sectional view showing a windshield and windshield header construction of an automobile including a windshield wiper motor, wiper arm, and a heated windshield wiper blade embodying this invention mounted on the end of the said wiper arm in the usual manner.

Fig. 2 is an enlarged cross sectional view of the embodiment of the heated windshield wiper scraper blade disclosed in Fig. 1 taken on the line 2—2 thereof.

Figs. 3 and 4 are enlarged cross sectional views of the embodiment of the heated windshield wiper scraper blade disclosed in Figs. 1 and 2 showing the said wiper and scraper blade being drawn across the windshield in the direction indicated by the arrows.

Fig. 5 is a greatly enlarged vertical sectional view taken on the line 5—5 of Fig. 1 showing the scraper blade heating element assembly.

Fig. 6 is a more or less diagrammatic view showing the heating element and its connections to the electrical system of a motor vehicle.

Fig. 7 is an enlarged cross sectional view similar to Fig. 2 showing an alternate embodiment of the invention.

Referring now to the drawing wherein like numerals refer to like and corresponding parts throughout the several views, the embodiments of the heated windshield wiper blades shown in the drawing are preferably constructed in combination with a standard type blade back or holder 20 which is connected to a windshield wiper arm 21 by suitable connecting means 22. The said connecting means 22 is of the usual type and is adapted to provide sufficient play between the wiper blade and the wiper arm 21 to permit the said wiper blade to trail the back 20 thereof when being moved arcuately across the windshield 23 in either direction as indicated by the arrows 24 in Figs. 3 and 4.

A reversible motor 25 is supported within the vehicle body preferably above the windshield 23 with the shaft 26 thereof extending through the windshield header construction 27. The windshield wiper arm 21 is connected on the protruding end of the motor shaft 26 by a spring pivot means 28 which constantly urges the depending end of the wiper arm 21 toward the windshield 23 with sufficient force to assure a positive contact between the wiper blade carried thereby and the windshield 23.

Referring now particularly to the embodiment of the invention disclosed in Figs. 1 to 6 inclusive, the improved heated windshield wiper scraper blade comprises one or more plies of flexible rubber wiping strips 29 and a flexible heated scraper blade assembly generally designated by the numeral 30 in the drawing juxtaposed to the said rubber wiping strips 29 as best shown in Figs. 2, 3 and 4. The upper portion of the said wiper blade is provided with a filler strip 31 on the outside of the rubber wiping strips 29 and on the outside of the heated scraper blade assembly 30 to permit the windshield wiper blade to be frictionally retained in the standard type windshield wiper blade back or holder 20. The heated wiping and scraping blade composed of wiping strips 29, heated scraper blade assembly 30 and filler strips 31 are preferably secured together into a unitary windshield wiper blade by such means as the rivets 32 located at intervals along the said wiper blade near the top thereof, see Figs. 2, 3 and 4.

The heated scraper blade assembly comprises a thin flexible heat resisting insulating strip 34 of Micarta or other suitable material capable of resisting temperatures up to say 300 degrees and a metal scraper blade 35 secured to the said flexible insulating strip 34 by means of two rows of rivets 36. The portion of the said metal scraper blade between the said two rows of rivets 36 is formed to provide a rectangular longitudinally disposed housing to accommodate a suitable heating element 39 as hereinafter described. The side of the flexible heat resisting insulating strip 34 adjacent to the wiping strips 29 is provided with a sheet of asbestos or other heat insulation 37 which depends slightly below the lower edge of the said heat resisting insulating strip 34. The side of the said heat resisting insulating strip 34 adjacent to the filler strip 31 is provided with a sheet of asbestos or other heat insulation 38 disposed opposite the said filler strip 31. The said asbestos sheets 37 and 38 are preferably cemented to the said heat resisting insulating strip 34.

A heating element 39 preferably comprising a loop of nichrome ribbon or other resistance heating material separated and surrounded by mica 40 or the like is connected by such means as a moulded terminal 41 to electrical lead wires 42 of the weatherproof current supply cable 43 which are connected to the battery 45 and ground 46 of the electrical system of an automotive vehicle or the like as diagrammatically indicated in Fig. 6. The said heating element is positioned in the longitudinally disposed housing provided therefor between the formed scraper blade 35 and the heat resisting insulating strip 34 before securing the said blade 35 and the strip 34 together by means of the rivets 36. The open ends of the said longitudinally disposed housing are preferably closed by cementing the moulded terminal 41 and the moulded end closure 44 in the ends thereof, see Fig. 5.

The said scraper blade 35 is formed from very thin strip steel and the lower edge thereof is rolled arcuately outward in respect to the vertical axis of the wiper blade of which it is a part and is tempered to permit flexing with the rubber wiping strips 29 when drawn across the surface 33 of a windshield 23 under pressure of the spring pivot means 28, the said windshield surface 33 being indicated in Figs. 3 and 4 by the dot and dash lines 33 therein.

The relative height of the scraper blade 35 above the rubber wiping strips 29 and the difference in the height of the said wiping strips 29 are preferably as indicated in Fig. 2 in order to permit the wiping strips 29 to clean the windshield 23 when being drawn across the surface 33 thereof as shown in Fig. 3 and to permit the heated scraper blade 35 to scrape the said windshield 23 followed by the cleaning thereof by the wiping strips 29 when being drawn across the surface 33 thereof as shown in Fig. 4.

The heated windshield wiper blade functions to wipe the surface of a windshield clean, to scrape heavy deposits of ice, snow and sleet from the surface of a windshield and, by virtue of the heated scraper blade, scrape and melt fine deposits of frost and ice from the windshield. These functions may be accomplished substantially simultaneously, or, if ice has been permitted to form on the windshield the windshield scraper blade 35 may scrape or shave off thick deposits of ice or sleet before the final cleansing is accomplished by closing a switch 45 causing current to flow to the heating element 39 which heats the said scraper blade 35 and causes it to melt a thin layer of ice or frost remaining on the windshield after the preliminary scraping. The scraping of the windshield will completely clean the same of snow, ice and sleet under most circumstances, however, in certain types of sleet and snow storms the cleaning of the windshield without the heating of the scraper blade takes a considerable time which is not only undesirable but inconvenient. Inasmuch as the heating element of the heated windshield wiper scraper blade need not be used continuously and only under extreme weather conditions, very little current need be consumed thereby.

Fig. 7 indicates another embodiment of the invention which is like the embodiment of the invention shown in Figs. 1 to 6 inclusive except that the asbestos heat insulating sheet 38 has been lengthened to extend over the upper portion of the metal scraper blade 35 and is designated by the numeral 380 in Fig. 7. Also, an asbestos heat insulating sheet 381 has been introduced between the metal scraper blade 35 and the thin flexible heat resisting strip 34. This embodiment permits more heat to be applied to the lower edge of the metal scraper blade 35 without an increase in current consumption inasmuch as heat losses are minimized at the upper portion of the said metal scraper blade 35.

Although but two specific embodiments of the invention have been disclosed and described herein, it will be understood that various changes including the size, shape, arrangement and details of the various parts thereof may be made without departing from the spirit of the invention, and it is not intended to limit the scope of the invention other than by the terms of the appended claims.

I claim:

1. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade secured to the lower portion of said flexible heat resisting strip, and electrical means for heating said scraper blade.

2. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade spaced below said holder and secured to the lower portion of said flexible heat resisting strip, and electrical means for heating said scraper blade.

3. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips secured to the lower portion of said flexible heat resisting strip, and electrical means for heating said scraper blade.

4. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips spaced below said holder and secured to the lower portion of said flexible heat resisting strip, and electrical means for heating said scraper blade.

5. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade secured to the lower portion of said flexible heat resisting strip, and an electrical heating element located in a longitudinally disposed housing formed in the upper portion of said scraper blade adapted to heat said scraper blade.

6. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade spaced below said holder and secured to the lower portion of said flexible heat resisting strip, and an electrical heating element located in a longitudinally disposed housing formed in the upper portion of said scraper blade adapted to heat said scraper blade.

7. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips secured to the lower portion of said flexible heat resisting strip, and an electrical heating element located in a longitudinally disposed housing formed in the upper portion of said scraper blade adapted to heat said scraper blade.

8. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips spaced below said holder and secured to the lower portion of said flexible heat resisting strip, and an electrical heating element located in a longitudinally disposed housing formed in the upper portion of said scraper blade adapted to heat said scraper blade.

9. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade secured to the lower portion of said flexible heat resisting strips, an electrical heating element located in a longitudinally disposed housing formed in the upper portion of said scraper blade adapted to heat said scraper blade, and an insulating sheet material covering over the upper portion of said heated scraper blade and element housing.

10. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade spaced below said holder and secured to the lower portion of said flexible heat resisting strip, an electrical heating element located in a longitudinally disposed housing formed in the upper portion of said scraper blade adapted to heat said scraper blade, and an insulating sheet material covering over the upper portion of said heated scraper blade and element housing.

11. In a windshield wiper blade, in combination with a holder, a wiping and heated scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips secured to the lower portion of said flexible heat resisting strip, an electrical heating element located in a longitudinally disposed housing formed in the upper portion of said scraper blade adapted to heat said scraper blade, and an insulating sheet material covering over the upper portion of said heated scraper blade and element housing.

12. In a windshield wiper blade, in combination with a holder, a wiping and heating scraper blade assembly adapted to be frictionally held within said holder comprising a plurality of resilient wiping strips and a flexible heat resisting insulating strip secured together along the upper portion thereof, sheet asbestos between said flexible heat resisting strip and said resilient wiping strips, a thin tempered flexible scraper blade having its lower edge rolled arcuately outward in respect to said resilient wiping strips spaced below said holder and secured to the lower portion of said flexible heat resisting strip, an electrical heating element located in a longitudinally disposed housing formed in the upper portion of said scraper blade adapted to heat said scraper blade, and an insulating sheet material covering over the upper portion of said heated scraper blade and element housing.

13. In combination with a windshield wiper blade composed of a holder and a plurality of resilient composition wiping strips held within said holder and depending therefrom, a flexible heat resisting insulating strip secured to said composition wiping strips, sheet asbestos between said heat resisting strip and said composition wiping strips, a thin tempered flexible metal scraper blade having its lower edge bent arcuately outward in respect to said wiping strips secured to said flexible heat resisting strip, the said heat resisting strip and scraper blade being adapted to flex with said wiping strips when drawn across a windshield under usual operating pressure, and electrical means for heating said scraper blade.

14. In combination with a windshield wiper blade composed of a holder and a plurality of resilient composition wiping strips held within said holder and depending therefrom, a flexible heat resisting insulating strip secured to said composition wiping strips, sheet asbestos between said heat resisting strip and said composition wiping strips, a thin tempered flexible metal scraper blade having its lower edge bent arcuately outward in respect to said wiping strips secured to said flexible heat resisting strip, the said heat resisting strip and scraper blade being adapted to flex with said wiping strips when drawn across a windshield under usual operating pressure, and electrical means enclosed by the upper portion of said scraper blade and lower portion of said heat resisting strip for heating said scraper blade.

HARRY H. GRECE.